Aug. 17, 1948.                P. T. NIMS                2,447,134
                        ELECTRICAL CONTROL SYSTEM
Filed July 13, 1946                                     5 Sheets-Sheet 1

INVENTOR.
Paul T. Nims.
BY
Harness and Harris
ATTORNEYS.

Aug. 17, 1948.   P. T. NIMS   2,447,134
ELECTRICAL CONTROL SYSTEM
Filed July 13, 1946   5 Sheets-Sheet 4

INVENTOR.
Paul T. Nims.
BY
Harness and Harness
ATTORNEYS.

Aug. 17, 1948.  P. T. NIMS  2,447,134
ELECTRICAL CONTROL SYSTEM

Filed July 13, 1946  5 Sheets-Sheet 5

INVENTOR.
Paul T. Nims.
BY
Harness and Harris
ATTORNEYS.

Patented Aug. 17, 1948

2,447,134

UNITED STATES PATENT OFFICE 2,447,134

ELECTRICAL CONTROL SYSTEM

Paul T. Nims, Detroit, Mich., assignor to Chrysler Corporation, Highland Park, Mich., a corporation of Delaware Application July 13, 1946, Serial No. 683,294

19 Claims. (Cl. 172—281)

The invention relates to electrical control systems and is particularly directed toward an improved control apparatus for regulating the transfer of power from an electrical input system to an electrical output system of the type shown, described, and claimed in my copending application Serial No. 565,955, filed November 30, 1944, for Electrical control system, and assigned to the same assignee as the present invention.

The principal objects of the present invention are to provide a system of the aforesaid type which is simple in arrangement, requires a minimum number of structural elements, is relatively light in weight, and is reliable and efficient in operation; to provide such a system in which multiphase alternating current input energy is translated into multiphase alternating current output energy; to provide such a system embodying improved means for timing the operations of the control apparatus associated with the several output phases; to provide in such a timing means a mechanical means whereby the relative phase angle between the various output phases may be fixedly predetermined; to provide such a system in which the multiphase output circuits of the several units may be connected in parallel and embodying improved means for controlling the division of load between the parallelly connected systems; to provide such a load-controlling mechanism which is operable to control the divisions of load by a relative shift in phase angles between the output of the two parallelly connected systems; and generally to improve and simplify the construction and arrangement of systems of the above generally indicated type.

With the above, as well as other and more detailed objects in view, which appear in the following description and in the appended claims, preferred but illustrative embodiments of the invention are shown in the accompanying drawings, throughout the several views of which corresponding reference characters are used to designate corresponding parts and in which Figs. 1A and 1B collectively provide a diagrammatic arrangement of power and control circuits for two units arranged in parallel to supply a multiphase output circuit. In reading the drawings Fig. 1B may be placed immediately to the right of Fig. 1A so that, with this arrangement, unconnected terminals of the two sheets will line up with correspondingly designated unconnected terminals on the other sheet, thereby completing the circuits which extend from one sheet to another;

Fig. 3 is a schematic arrangement of a modified form of control circuit adapted for use with the power circuit shown in Figs. 1A and 1B;

Figure 1A:
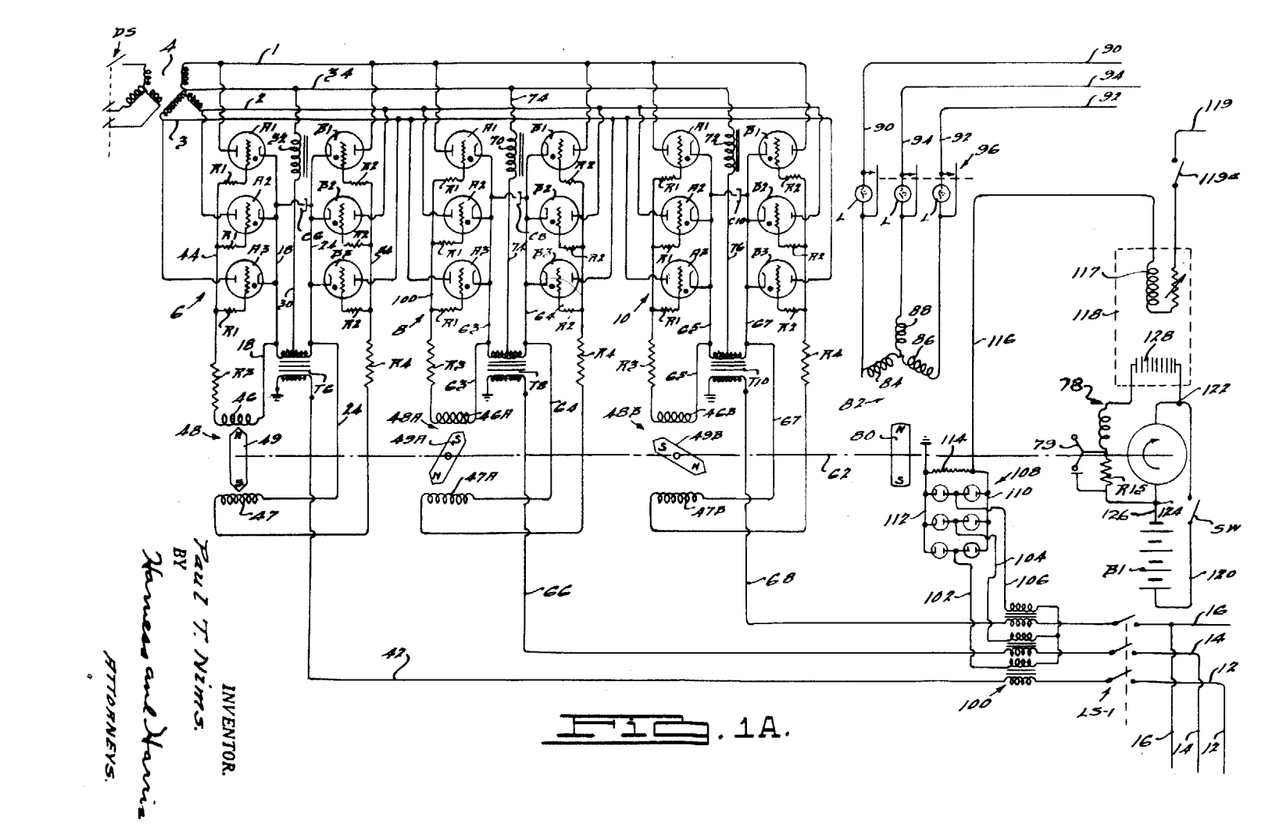
Figure 1B:
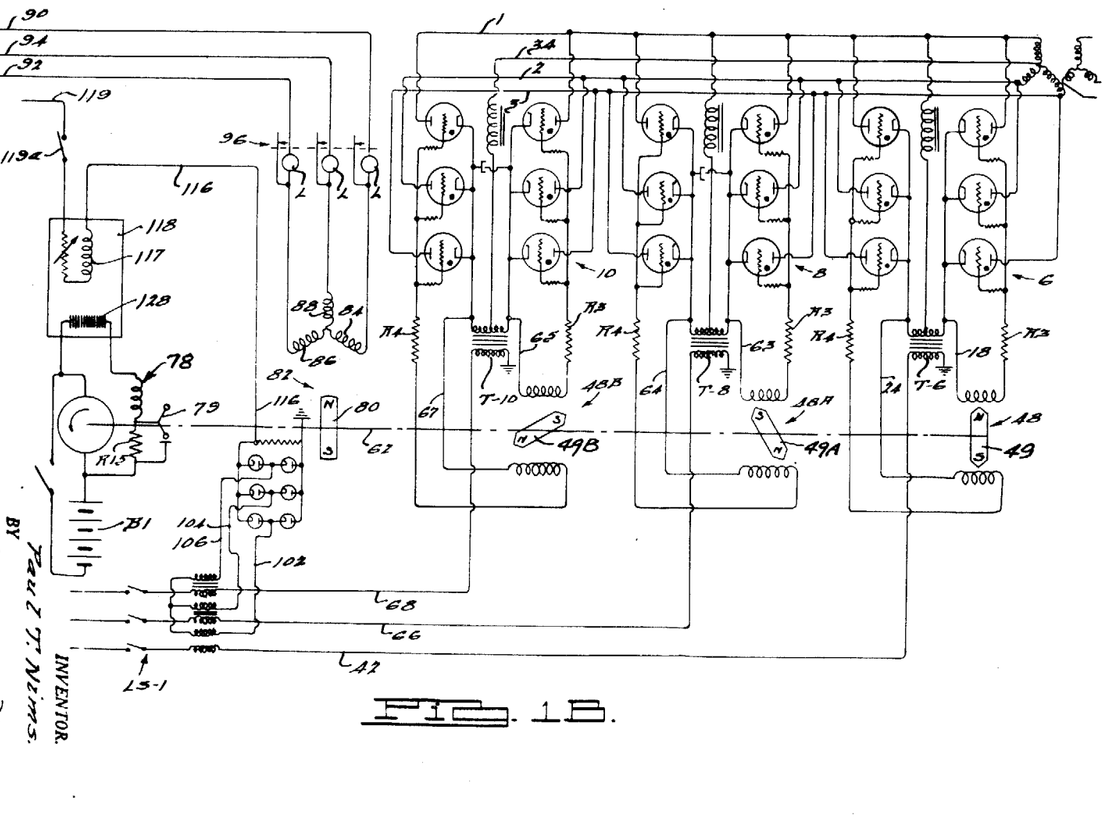

Referring first to Figs. 1A and 1B, which show substantially identical power and control circuits for two substantially identical units connected in parallel to a common output circuit, the input circuits for the substantially identical units of Figs. 1A and 1B are shown to be from two separate sources. However, it is to be distinctly understood that, if desired, the units could both be connected to the same common source for feeding the same common output system. For these reasons it is believed a description of one power and one control unit will suffice for a description of both, except in the respects hereinafter noted.

In Fig. 1A, power is supplied from a suitable source to conductors 1, 2, and 3 by a suitable three-phase transformer 4 and transferred by means of a plurality of networks 6, 8, and 10 to a three-phase output system comprising conductors 12, 14, and 16. Each network 6, 8, and 10 comprises two sets of electric valve means, each set comprising three triodes A1, A2, and A3 and three triodes B1, B2, and B3. Each of the A and B triodes have anodes, grids, and cathodes. The anodes of the A triodes are connected respectively to lines 1, 2, and 3, and the cathodes thereof are connected to a common cathode output bus 18 connected to one terminal of the primary coil of transformer T6. Likewise, the anodes of the B triodes are connected respectively to the input conductors 1, 2, and 3, and the cathodes thereof are connected to a common output bus 24 which is connected to the other terminal of the primary coil of transformer T6. The primary coil of transformer T6 has a center tap which is connected by means of conductor 30 and an inductive reactor 32 to a bus 34 connected to the center or neutral point of the Y-connected three-phase transformer 4. One terminal of the secondary coil of transformer T6 is connected directly to ground, while the other terminal is connected by conductor 42 to the output conductor 12. All the grids of the A valves of group 6 are connected through grid resistor R1 to a common grid connection 44. Grid bias voltage is supplied by a voltage inducing mechanism generally designated 48 and having a rotating permanent-magnet type rotor 49 for inducing a voltage in its output coils 46 and 47. The coil 46 has a resistance R3 in series therewith and is connected between the buses 18 and 44 whereby the grid bias of all of the grids of the A valves of group 6 may be simultaneously biased. Likewise, all the grids of the B triodes are connected through resistors R2 to a common grid bus 54 and are simultaneously biased with respect to their cathodes by the voltage induced in coil 47 which is connected between the buses 24 and 54 and has a resistor R4 in series therewith. The rotor 49 is rotated by a shaft 62 at the same R. P. M. as the cycles per minute output of the secondary coil of transformer T6 and alternately biases the grids of the A and B triodes as groups to render them in a conductive condition. In order that only one set of triodes A or B may conduct at one time, a condenser C6 is connected between the common cathode buses 18 and 24, the operation of which will be set forth in greater detail hereinafter. Condensers C8 and C10 are likewise respectively connected between the common cathode buses of the A and B triodes of groups 8 and 10.

Figure 4:
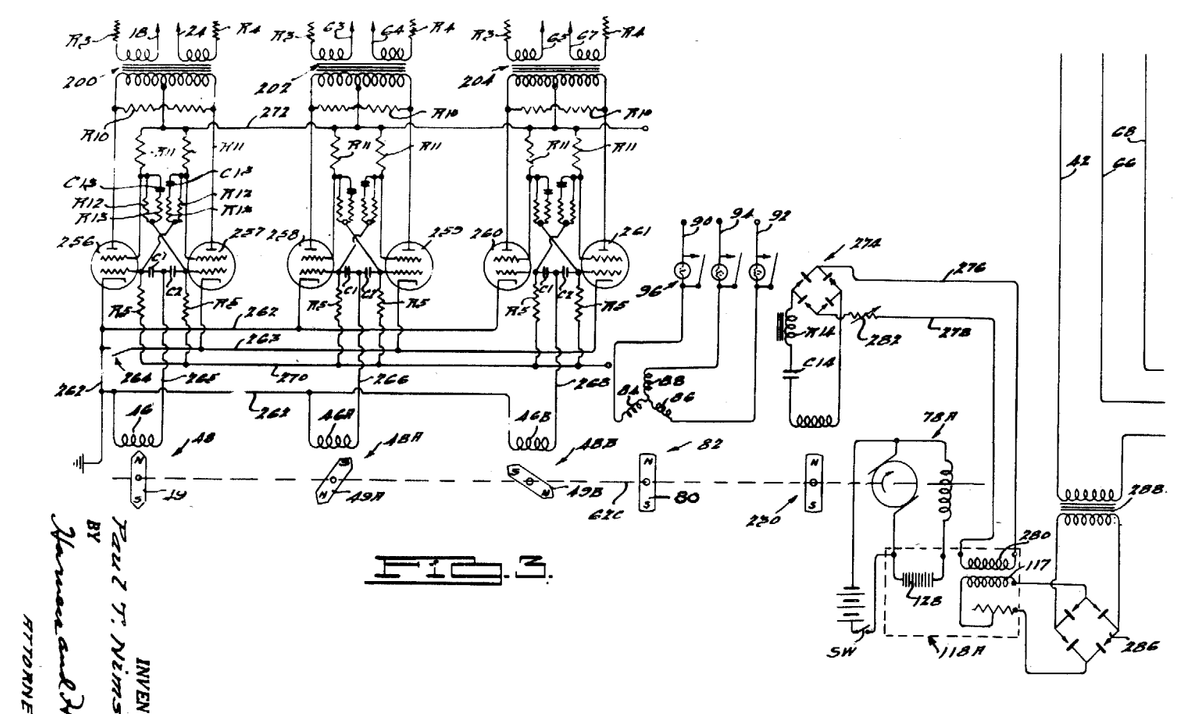
Fig. 4 is a curve depicting the flux in the inducing mechanisms shown in connection with the control circuits of Figs. 1A, 1B and 3.
Figure 5:
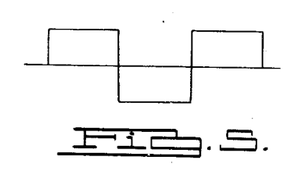
Fig. 5 is a curve depicting the voltage induced in accordance with the flux curve of Fig. 4.
Figure 6:
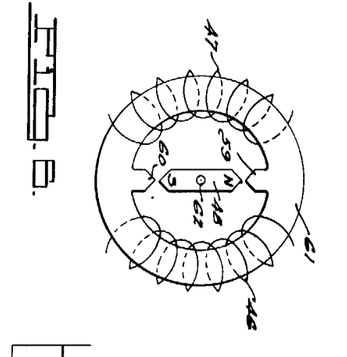
Fig. 6 is a diagrammatic view of the pole pieces by which the flux waves and voltage waves of Figs. 4 and 5 may be obtained.

As shown in Fig. 6, the shape of the rotor 48 is tapered and arranged with respect to the taper of the pole pieces 59 and 60 of the core 61 having the coils 46 and 47, so that a flux wave similar to that shown in Fig. 4 is induced in the core 61. The coils 46 and 47 will have induced therein a voltage of substantially the form shown in Fig. 5. The provision of the square voltage wave is desirable so that the grids of the valve will be biased immediately and completely at the desired times. It is to be distinctly understood, however, that other types of voltage induction apparatus can be used to supply the bias voltage of the square wave form. Other forms of voltage waves which will place the critical bias on the grid at the correct times may be used; however, the square wave seems best suited for this purpose.

As the triodes A of group 6 are rendered conductive, current flows, from one of the input conductors 1, 2, or 3, through whichever one of the A triodes A1, A2, or A3 happens to have its anode at the highest positive potential as determined by the instantaneous voltages being induced in the conductors 1, 2, or 3 during the time interval that the A triodes are conductive as is more fully described in my said copending application. Current from the A triodes of group 6 flows from bus 18 through the left-hand half of the primary coil of transformer T6 back through the conductor 30, and the inductive reactance 32 to the neutral line or bus 34 causing a voltage to be induced in the secondary coil whereby current may flow in the conductor 42 and the output conductor 12. Similarly, when the B triodes of group 6 are conducting, current will flow therethrough, through bus 24 and the right-hand side of the primary coil of transformer T6 and back through conductor 30 and reactance 32 to bus 34 causing a voltage, of opposite polarity to that caused by conduction of the A triodes, to be induced in the secondary coil of transformer T6.

The valve group 8 has A and B triodes having their anodes connected to the conductors 1, 2, and 3 and their cathodes connected respectively to opposite end terminals of an output transformer T8 by buses 63 and 64. The grids of the triodes of group 8 are periodically biased with respect to their cathodes by a voltage inducing mechanism 48A which is similar in all respects to mechanism 48, except that its rotor 49A is displaced 120° about the shaft 62 behind the rotor 49. The voltages induced in the secondary coil of transformer T8 and delivered by conductor 66 to the output conductor 14 are therefore 120 electrical degrees behind those in conductor 12. Similarly, the valve group 10 has A and B triodes having their anodes connected to the conductors 1, 2, and 3 and their cathodes connected respectively to the opposite end terminals of an output transformer T10 by buses 65 and 67. The grids of the triodes of this group 10 are periodically biased with respect to their respective cathodes by a voltage inducing mechanism 48B similar in all respects to mechanisms 48 and 48A, except that its rotor 49B is displaced 120° about the shaft 62 behind the rotor 49A so that the voltages induced in the secondary coil of transformer T10 and delivered through conductor 68 to the output conductor 16 are 120 electrical degrees behind those in conductor 14. The center taps of the primary coils of transformers T8 and T10 are respectively connected through inductive reactors 70 and 72 by means of conductors 74 and 76 respectively to bus 34. In order that the system may be disconnected from the output conductors a three-pole line switch LS–1 is used to connect the conductors 42, 66, and 68 to the conductors 12, 14, and 16.

All the rotor or rotating members 49, 49A, and 49B are mechanically secured to and rotated by the shaft 62 which is driven by a direct-current motor 78. The speed of the motor 78 is controlled by means of a governor generally designated 79 which acts to open and close a shunt circuit around a current-controlling resistor R15 which will cause the current through the field coil of the motor 78 to increase or decrease. A flux-inducing member or rotor 80 of a three-phase alternator 82 having phase coils 84, 86, and 88, is also rotatable by shaft 62. The coils 84, 86, and 88 are preferably Y connected and adapted to be connected to a similar alternator 82 of the system of Fig. 1B having a rotor 80 which is rotated by a shaft 62. The mechanisms 48, 48A, and 48B of Fig. 1B are rotated by a shaft 62 corresponding thereto and are in the same identical phase relationship as are the rotor 80 and the mechanisms 48, 48A, and 48B of Fig. 1A so that when the output voltages of the two alternators 82 are in phase the power systems are in phase. A three-pole switch 96 is connected to the phase coils 84, 86, and 88 of alternator 82 and when closed connect the alternator 82 to the conductors 90, 92, and 94 respectively. Switch 96 of Fig. 1B similarly connects the alternator 82 of Fig. 1B to the conductors 90, 92, and 94. Incandescent lamp bulbs L are shunt connected with respect to the switch blades of the three-pole switch 96, so that when the systems of Figs. 1A and 1B are in proper phase relation with each other the switches 96 and LS—1 may be closed. If desired, the switches 96 and LS—1 may be mechanically interlocked for simultaneous operation. The relative torques exerted on the shaft 62 by the motor 78 and alternator 82 are such that the shaft is primarily rotated by the motor 78 but the torque of the alternator 82 is operable to cause momentary changes in the angular velocity of the shaft 62 whereby the time instants, at which corresponding valves of the systems of Figs. 1A and 1B are rendered conductive, may be controlled.

A three-phase current transformer 100 is connected in series with the output conductors 42, 66, and 68 whereby the current flowing through each of these conductors 42, 66, and 68 causes a proportionate current flow in each of the transformer secondary output conductors 102, 104, and 106. These secondary output conductors are connected to a full-wave three-phase rectifying device 108 having D. C. output conductors 110 and 112. A resistor 114 is connected between the output conductors 110 and 112 and the voltage thereacross is proportional to the current output of the conductors 42, 66 and 68. The terminal of the resistor 114 connected to the conductor 112 is grounded while the other terminal of the resistor 114 is connected by conductor 116 to an adjustable controlling element 117 of a D. C. motor speed control generally designated 118 which controls the motor 78. Likewise, the output conductors of Fig. 1B have current transformers therein feeding a rectifying device, a resistor 114 and an output conductor 116 connected to a controlling element 117 of a D. C. motor speed control 118 for the motor 78. The other terminals of the elements 117 are connected together by a conductor 119 having disconnect switches 119a which may be mechanically interlocked with LS—1 if desired. Any unbalance in the voltage drops across the two resistors 114, causes current flow through the elements 117, tending to balance the loading of the two systems.

Returning again to Fig. 1A, the direct-current motor 78 is supplied with energy from a battery B1. One terminal of battery B1 is connected by a conductor 120 and switch SW to the motor rotor terminal 122 and one end of the carbon pile resistance element 128 of the control 118. The other battery terminal is connected by conductor 126 to the motor terminal 124 which is internally connected to one end of the field winding and the rotor. The end of the field winding of motor 78 opposite to that connected to terminal 124 is connected to the terminal of the carbon pile resistance element 128 opposite to that to which the conductor 120 is connected.

Figure 2:
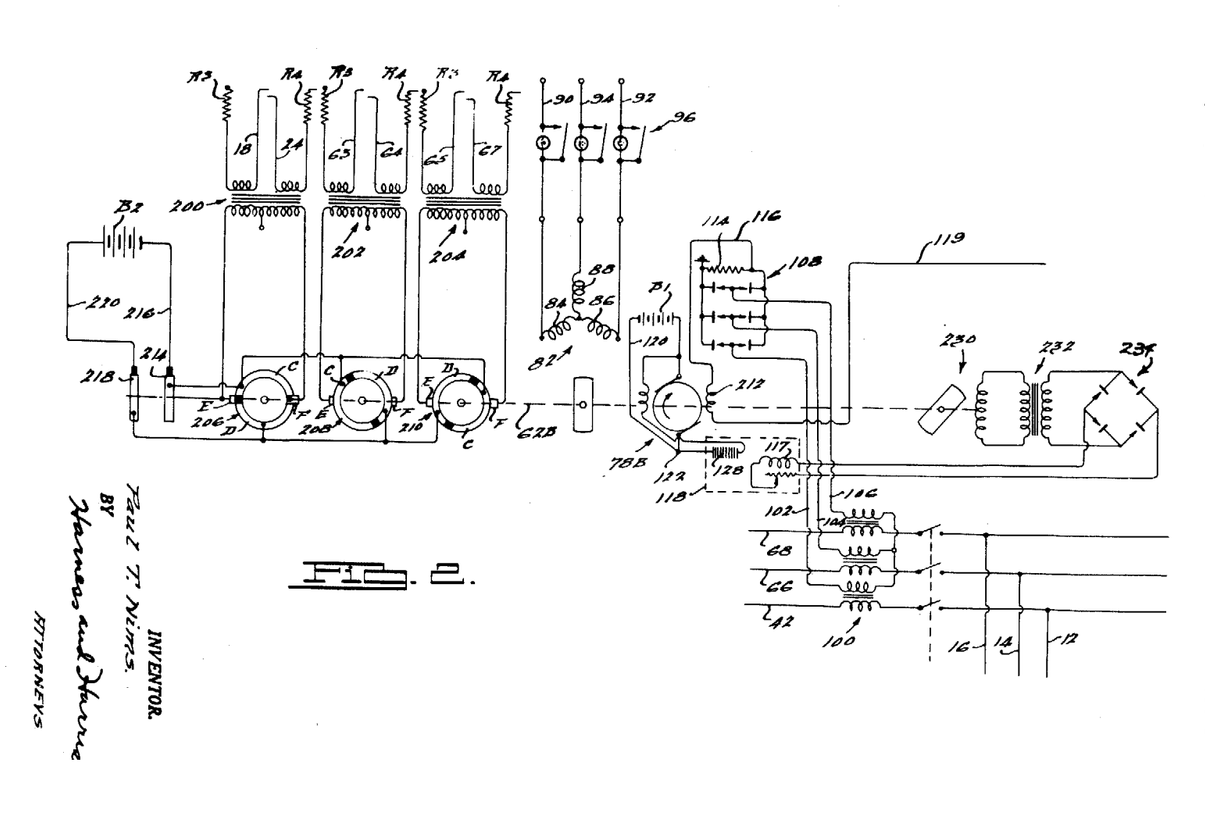
Fig. 2 is a view showing a modified control circuit adapted for use with the power circuit shown in Figs. 1A and 1B.

In Fig. 2 the resistances R3 and R4 and the end terminals of the transformers T6, T8, and T10, instead of being connected to the voltage-inducing coils 46 and 47 of the voltage-inducing mechanisms 48, 48A, and 48B, are connected to secondary coils of transformers 200, 202, and 204, respectively. Each of the commutators 206, 208, and 210 comprises two substantially semicircular conducting rings C and D insulated from each other. The commutators are arranged relative to each other on the shaft 62B such that the C and D rings sequentially close the circuit to the primary coils of the transformers 200, 202, and 204, for flow of current in the same direction therethrough at 120° intervals during rotation of shaft 62B. The reactance of the transformers 200, 202, and 204 is preferably such that during the time intervals that it is energized, the current through the primary coil continually increases at a substantially constant rate so that the voltage induced in the secondary coils will be of the shape shown in Fig. 5. The C rings of the commutating elements 206, 208, and 210 are connected together and to a slip ring 214 which slip ring is connected to one terminal of a battery B2 by a conductor 216. The D rings of the elements 206, 208, and 210 are connected together and to a slip ring 218 which slip ring is connected to one terminal of the battery B2 by a conductor 220.

The terminals of the primary coils of the transformers 200, 202, and 204 are connected to corresponding brushes E and F diametrically arranged to engage the rings C and D as the shaft 62B rotates, so that for each revolution of the shaft the transformers are energized once with current flowing in one direction and once with current flowing in the opposite direction to bias the grids of the A triodes positively for substantially a half revolution and to bias the B triodes positively for substantially a half revolution, it being remembered that the various transformers are energized at points of revolution of the shaft 120° apart.

The shaft 62B is rotated by a direct current motor 78B similar to motor 78 except that it has a second field winding 212. Motor 78B is connected similarly to the motor 78 to a battery B1 with the main field winding connected through the carbon pile resistance element 128 of the control 118. The second field winding 212 is connected between the conductors 116 and 119 so that any unbalance in the voltage drops across the resistors 114 of the system of Fig. 2 and a corresponding parallelly connected system (not shown) identical therewith or a similarly connected resistor 114, as for example, resistor 114 of the systems of Figs. 1A and 1B will cause a current to flow through coil 212 in directions to momentarily change the angular velocity of the shaft 62B to increase or decrease the voltage phase angles between the parallelly connected systems.

To control the frequency of the output voltage of conductors 42, 66, and 68 and the speed of the motor 78B, a circuit for providing current flow of constant magnitude and duration but at variably spaced intervals depending upon the speed of rotation of the motor 78B is provided by a single-phase alternating current generating unit 230 arranged to be driven by the shaft 62B. The output terminals of unit 230 are directly connected to the terminals of the primary coil of a saturable core-type transformer having its secondary coil terminals connected directly to the alternating current terminals of a full wave bridge rectifier generally designated 234. The direct current output terminals of the bridge rectifier 234 are connected to the terminals of the control element 117 of the motor speed control 118.

Figure 8:
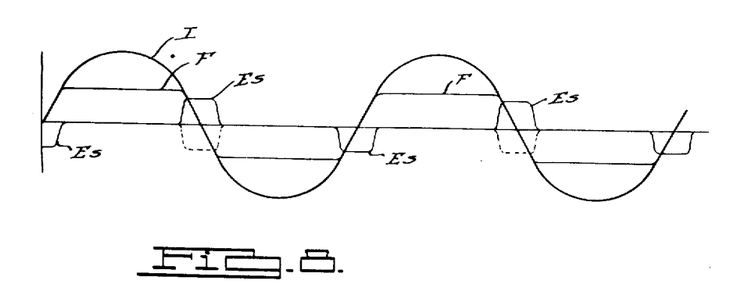
Fig. 8 is a series of curves depicting various operating characteristics of the speed-controlling mechanism depicted in Fig. 2.

Fig. 8 graphically shows a typical example of the input current curve I, of the flux curve F within the core, and of the secondary current ES of transformer 232. The dotted-line portion of the secondary current, together with the lower solid-line portions of the secondary current ES graphically illustrates the current flow in the D. C. output system to the control element 117. As the rotational speed of the shaft 62B increases the frequency of the voltage generated by the unit 230 increases and the number of current pulses per unit of time likewise increases so that the average current per unit of time increases. This change in average current changes the excitation of the motor 78B and consequently its speed.

In Fig. 3 the grid biasing circuits comprising the grid resistors R3 and R4 and the buses 18, 24, 63, 64, 65, and 67 are fed through transformers 200, 202, and 204 of an inverter of "flip flop" network controlled by voltage-inducing mechanisms 48, 48A, and 48B driven by a speed-controlled direct-current motor 78A similar to motor 78. The inverter network comprises three pairs of tetrode electronic high vacuum valves 256—257, 258—259, and 260—261 co-operable with the three transformers 200, 202, and 204 respectively. A grounded bus 262 connects together, the cathodes of the valves 256, 258, and 260 and the left-hand end terminals of the voltage-inducing coils 46, 46A, and 46B of the voltage-inducing mechanisms 48, 48A, and 48B. The cathodes of the valves 257, 259, and 261 are connected to a common bus 263 which is selectively connected to the bus 262 by a switch 264 which, during operation, is normally maintained closed but is opened during the starting operation of the network as will be more fully described hereinafter. The valves 256–261 are periodically rendered conductive for energizing the transformers 200, 202, and 204 to control the power valves of groups 6, 8, and 10. The end terminals of the coils 46, 46A, and 46B opposite that to which the bus 262 is connected are respectively connected by means of conductors 265, 266, and 268 to the common terminals of each of the sets of condensers C1 and C2 connected in series between grids of the pairs of valves 256—257, 258—259, and 260—261. Each of the grids of all the valves 256—261 is connected through a resistor R5 to a common bus 270.

Each pair of valves 256—257, 258—259, and 260—261 are respectively interconnected together whereby the firing or conducting of one of the valves of any pair will extinguish or render nonconductive the other valve of the pair and whereby the firing of a valve will energize the transformer 200, 202, or 204, with which it is associated. The specific circuit arrangement interconnecting the valves of each pair and connecting each pair to its corresponding transformer are identical, and a specific description of one such circuit arrangement will be sufficient for all three. The anodes of the valves 256 and 257 are connected to opposite end terminals of the primary coil of transformer 200. Plate current is supplied to valves 256 and 257 from a bus 272 of, for example, 115 volts positive D. C. connected to the center tap connection of the primary coil of transformer 200. The zero or negative potential is supplied through the grounded bus 262 to the cathode of valve 256 at all times and by means of switch 264 to the cathode of valves 257, 259, and 261 during normal operation. A resistor R10 is connected across the end terminals of the primary coil of transformer 200 to load the valves 256 and 257 so that charges in loading of the transformer will have little effect on the operation of the valves.

The supplemental anodes of the valves 256 and 257 are connected through resistors R11 to the bus 272 to supply the supplemental anode potential. The supplemental anode of valve 256 is connected through an impedance network to the grid of the valve 257 and vice versa so that as one of the valves 256 or 257 conducts, the grid potential of the valve 257 or 256 will be rendered negative to extinguish and maintain the other valve nonconductive and the grid potential of the valve 256 or 257 more positive to maintain the conductive valve conductive. The impedance network comprises a first resistor R11 and in series therewith a resistor R12 having in parallel therewith a resistor R13 connected in series with a capacitor C13.

Figure 7:
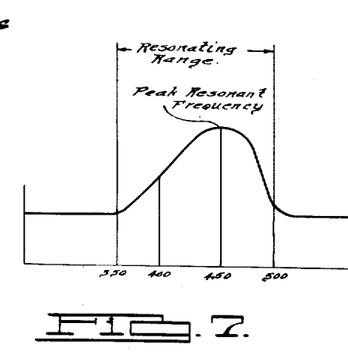
Fig. 7 is a curve depicting the change in current through the tuned circuit of Fig. 3 with change in frequency of the voltage applied thereto.

The shaft 62C, besides rotating the rotors 49, 49A, and 49B, rotates the rotor of the three-phase alternator 82 identical to that shown in the other figures and the alternating current generating unit 230 identical to that shown in Fig. 2. The output of the unit 230 of Fig. 3, however, is utilized in a different manner to control the rotational speed of the shaft 62C in that it is connected to a tuned circuit having a resonating range and a peak resonating frequency within this range. By "resonating range" is meant that range of frequencies wherein the current flowing in the tuned circuit is substantially greater than at frequencies outside this range because of the resonance of the circuit. By "peak resonant frequency" is meant that frequency wherein the current is maximum. The tuned circuit comprises a capacitor C14 and an inductive reactor R14 connected in series with a full wave bridge rectifier 274. The direct current terminals of the bridge rectifier 274 are connected by conductors 276 and 278 to one of the control windings 280 of a motor speed-controlling unit 118A which is similar to the unit 118, except that it has the additional winding 280. When the shaft 62C and rotor of the alternator 230 are rotating at the desired speed, the frequency of the voltage supplied to the tuned circuit is, for example, 400 cycles per second. As shown in Fig. 7, this frequency is substantially midway between the beginning of the resonating range and the peak resonant frequency. Therefore, as the frequency of the induced voltage or speed of rotation of the shaft 62C changes, the current flowing through the tuned circuit will increase or decrease, depending upon whether the speed of rotation of the shaft decreases or increases. This changed current flowing through the tuned circuit causes a corresponding change in current flow to the control winding 280 to change the flow of current through the carbon pile resistor 128 for varying the speed of the direct-current motor. The magnitude of current flow through the conductors 276 and 278 is controlled by a variable resistor 282.

The adjustable control element 117 of the direct-current speed control 118A is connected to be responsive to the output of the system of Fig. 3 and is so arranged to provide a slightly drooping characteristic to the motor 78A with increasing output of the system. The control 118A is connected across the direct-current output terminals of the full wave bridge-type rectifier 286 having its alternating current terminals directly connected to the secondary coil of a current transformer 288 connected in the output circuit of one of the system output phases, as for example, conductor 42 of the system of Fig. 3 to provide for a current through the adjustable control element 117 proportional to the current flowing through the conductor 42.

The operation of the systems of Figs. 1A and 1B is as follows: Switch SW of Fig. 1A, is closed to initiate operation of the direct-current motor 78 and the disconnect switch DS is closed to energize the three-phase transformer 4. Energization of the motor 78 acts to rotate the rotors 49, 49A, 49B, and 80, of the voltage-inducing mechanism 48, 48A, and 48B and of the three-phase alternator 82. The governor 79 acts to maintain the motor 78 operating at a substantially constant desired speed. The alternator 82 generates a three-phase alternating voltage and if another system such as, for example, the system of Fig. 1B is already in operation, the lamps L will go on and off at the beat frequency of the systems. When the lamps L are substantially out, the switches 96 and LS—1, which may be mechanically interconnected for convenience of operation if desired, are closed, connecting the output of the alternator 82 with the output of the corresponding alternator 82 of the system of Fig. 1B and connecting the ouput conductors 42, 66, and 68 of the system of Fig. 1A in parallel with the system of Fig. 1B to the output conductors 12, 14 and 16. Switches 119A may also be closed at this time to energize the load dividing circuit.

Voltages are periodically induced in the coils 46 and 47 of the voltage-inducing mechanism 48 which act to periodically bias the grid of the valves A1, A2, and A3 of group 6 positively with respect to their cathodes so that the valves A1, A2, and A3 are placed in condition to conduct current from the alternating current supply conductor 1, 2, or 3, to the output transformer T6. Similarly, the voltage induced in the coil 47 of the mechanism 48 will render the valves B1, B2, and B3 of group 6 in condition for conducting alternately with the A valves. The A valves of group 6, when rendered in a condition to conduct, will select among themselves which is to be the one which actually conducts the current, depending entirely upon the instantaneous relative potentials of the phases of the transformer 4, as is more completely described in my said copending application. Similarly, when the valves B1, B2, and B3 are rendered by the coil 47 in condition for conducting current these valves will likewise conduct current from the input conductors 1, 2 and 3 to the output transformer T6, depending upon the instantaneous potentials of the phases of the transformer 4.

Direct current therefore flows periodically through the opposite halves of the center tapped primary coil of the output transformer T6 and returns to the common bus 34 through the conductor 30 and inductive-reactance 32. Supposing the A valves of group 6 to be conducting and the voltage-inducing mechanism 48 has just rendered the B valves of group 6 conductive, at the first conduction of one of the valves B1, B2, or B3, the potential of the common cathode bus 24 will be raised substantially to the potential of the anode of the conducting one of the valves and since the condenser C6 was charged during the time that the A valves were conducting so that the potential thereacross was substantially twice that of the potential between the bus 18 and the conductor 30 and the bus 18 was substantially at the potential of the anode of the conducting one of the A valves, the increase in potential of the bus 24 will immediately transitorily raise the potential of the bus 18 so that the cathode of the conducting one of the A valves will transitorily be raised to a potential above that of its anode, whereby the conducting valve is extinguished. The capacity of the condenser C6 is such that it will not discharge through its discharge circuit which is the primary coil of the transformer T6 until such time as the conducting one of the valves has had time to deionize.

It will be evident that for each complete revolution of the shaft 62 a potential of the right polarity will be induced in each of the coils 46 and 47 thereof so that the A group of valves will be rendered conductive and the B group of valves will be rendered conductive once during each such revolution. Therefore, the frequency of the voltage in the conductor 42 will be the same frequency as the rotational speed of the shaft 62. The voltage-inducing mechanisms 48A and 48B similarly control the A and B valves of groups 8 and 10 whereby alternating current potential is supplied to the conductors 66 and 68 and, as stated hereinbefore, the change in potential of the mechanisms 48, 48A and 48B is approximately 120° apart so that the conductors 42, 66 and 68 form a three-phase current output.

Assuming that the systems of Figs. 1A and 1B are now operating in parallel to supply the conductors 12, 14, and 16 with current, the transformers 100 of each system will cause a current flow through the respective resistors 114 which is proportional to the current output of the respective system. Since one terminal of each resistor 114 is grounded, current will flow through conductors 116 and 119 and control elements 117 in a direction and of a magnitude proportional to the difference in voltages across the two resistors 114. Suppose, for example, the system of Fig. 1A is carrying more than its share of the load, the voltage drop across the associated resistor 114 will be greater than the voltage drop across the resistor 114 of the system of Fig. 1B. Current will then flow from the resistor 114 of the 1A system through the control elements 117 through the resistor 114 of the 1B system and back to the 1A system through the ground connection. This current acting through the speed control 118 will cause the motor 78 of Fig. 1A to momentarily decrease its angular velocity and the motor 78 of Fig. 1B to momentarily increase its angular velocity whereby the instants that the valves of the systems of Figs. 1A and 1B are respectively rendered conductive are relatively delayed and hastened so that the current supplied by the system of Fig. 1A is decreased, while the current supplied by the system of Fig. 1B is increased the desired amount so that the two systems will be supplying their correct proportion of current to the output conductors 12, 14, and 16.

For synchronizing the two systems, three-phase alternators 82 of Figs. 1A and 1B are connected as shown. No power is transferred from either of the alternators to the other when the alternators are operating at identical speed and are identically phased with respect to each other. Should one of the alternators, however, vary slightly in speed or in phase angle with respect to the other alternator, the leading one of the alternators 82 will tend to drive the lagging one of the alternators 82 as a motor to exert a slight additional torque to the shaft 62 to provide a slightly increased angular velocity thereto. The leading one of the alternators 82 will absorb torque from its driving shaft 62 to impart a slightly decreased angular velocity thereto so that the two systems will tend to remain in absolute synchronous operation with constant phase angles therebetween; it being understood, however, that these changes in speed of the shaft 62 are momentary and merely vary the angular velocity of the two shafts 62 with respect to each other.

In Fig. 2 the grid biasing voltages are provided from a direct-current source such as the battery B2 and applied to transformers 200, 202, and 204 by the commutators 206, 208, and 210, respectively which are rotated by the shaft 62B. As the shaft rotates, the conducting portions of the commutators C and D act to alternately energize the primary coil of the associated transformer first in one direction and then in a second direction. As stated hereinbefore, the impedance of the transformers is such that throughout the time interval that the transformer is energized in one direction, the current is constantly increasing to provide a voltage wave in the secondary coils of substantially the form shown in Fig. 5.

It is believed obvious from the above and from the description with respect to the systems of Figs. 1A and 1B that as the motor 78B rotates the commutator, a three-phase alternating voltage will be provided between the conductors 42, 66, and 68 and the current through these conductors will set up a proportional voltage drop across the resistor 114 associated with the three-phase rectifying device 108. As the current in the conductors 42, 66, and 68 increases, the voltage drop across the resistor 114 will increase, and if a similar resistor 114 connected to another such system has a lesser potential drop thereacross, current will flow through the conductor 116 and through the second field coil 212 of the motor 78B through the conductor 119 and the corresponding resistor, not shown, of the parallelly connected system back to the ground terminal. This current flow through the coil 212 tends to set up a flux which is in the same direction as the flux set up by the normal field coil of the motor 78B to momentarily increase the excitation of the motor 78B. This tends to momentarily decrease the angular velocity of the shaft 62B so that the current through the conductors 42, 66, and 68 will be decreased. This current flow through the conductor 119 will tend to have an opposite effect on the motor 78B associated with a parallelly connected system which will tend to set up a flux in the motor which is in opposition to the flux set up by the normal field coil. This results in a momentary decreased excitation to momentarily increase the angular velocity of the shaft 62B associated therewith so that the associated system (not shown) will tend to take more of the load being supplied to the output conductors 12, 14, and 16.

The shaft 62B also drives the alternating current generating unit 230 whereby a current is caused to flow through the control element 117 of the speed control 118. The transformer 232 is of the saturable core type so that, while the current through the primary winding thereof is continually changing in accordance with the voltage output of the unit 230, the flux which is set up in the core of the transformer 232 merely changes for a short period each time that the current goes through zero, so that a pulsating current of substantially constant amplitude and duration flows in the secondary circuit of transformer 232 at a frequency directly proportional to the frequency of the voltage supplied to the transformer by the unit 230. Therefore, as the speed of rotation of the unit 230 increases, more average current will flow through the control element 117 than would flow were the speed of rotation of the unit 230 lower. This change in current flowing through the element 117 acts on the carbon pile 128 of the control 118 to vary the current flowing through the normal field coil of the motor 78B. As the current flow through the element 117 increases, the current flow through the normal field coil will increase, thereby tending to slow down the motor 78B. The unit 230 is preferably used to control the actual speed of the shaft 62B and, therefore, the frequency of the voltage supplied by the conductors 42, 66, and 68, rather than as a means for synchronizing operation between two parallelly connected systems. If a system of Fig. 2 is being operated in parallel with a similar system, the alternator 82 may be connected as described in connection with the systems of Figs. 1A and 1B; or, if the system of Fig. 2 is to be used by itself, conductors 90, 94, and 92 may be connected to a three-phase system operating at the desired frequency and voltage for regulating the speed of the alternator 82 in the same manner. As in the preceding instances the torque capable of being absorbed in or exerted by the alternator 82 is substantially less than that exerted by the motor 78B so that the alternator 82 merely serves to slightly increase or decrease the angular velocity of the shaft 62B in order to bring the frequency of the output of conductors 42, 66, and 68, to the exact desired frequency.

In the system shown in Fig. 3 a somewhat more elaborate means for rendering the power valves of the groups 6, 8, and 10 conductive is provided and is operated by suitable voltage inducing mechanisms 46, 46A, and 46B which have one output coil each 46, 46A, and 46B. At each voltage impulse of the same polarity of the coils of the voltage-inducing mechanisms, one of the two valves associated therewith is rendered conductive and the other non-conductive in alternate fashion; the various groups being rendered conductive and nonconductive at 120° intervals of the revolution of the shaft 62C.

In starting the system, the switch 264 is opened and the motor 78A is energized. As the rotors 49, 49A, and 49B rotate, an alternating voltage is periodically induced in the coils 46, 46A, and 46B respectively. At each positive impulse, the grids of the valves 256, 258, and 260 respectively are rendered positive with respect to their associated cathode and the valves will become conductive and since switch 264 is open will remain conductive. Assume that the switch 264 is closed just after the mechanism 46B has supplied a positive impulse and before mechanism 46 has started to supply a positive impulse. The next impulse supplied by the coil 46 will place a positive bias on grid of the valve 257 and the valve 257 will be rendered conductive. As soon as the valve 257 becomes conductive, current will flow from the supplemental anode thereof through the resistor R11 which will lower the potential of the end thereof connected to the supplemental anode which will also lower the potential of the control grid of the valve 256. This lowering of the potential of the grid of the valve 256 tends to reduce the flow of current therethrough, reducing the flow of current from the supplemental anode thereof to the cathode thereof, thereby raising the potential of the end of the resistor R11 connected to the supplemental anode of the valve 256 which terminal is connected through an impedance network to the control grid of the valve 257. This still further raises the potential of the control grid of the valve 257, causing a greater flow of current therethrough which further lowers the potential of the supplemental anode of the valve 257, and, as before outlined, this will lower the potential of the control grid of the valve 256, causing a further decrease in the current flow therethrough and a consequent raising of the potential of the supplemental anode of the valve 256 and a further raising of the potential of the control grid of valve 257. This series of events happens very rapidly, and valve 256 is soon rendered nonconductive, and the valve 257 rendered fully conductive. A similar series of events occurs at the next pulse of the coil 46A whereby the valve 259 is rendered conductive and the valve 258 is rendered nonconductive, and, similarly, the next pulse of potential from the coil 46B renders the valve 261 conductive and the valve 260 nonconductive. The next time a positive impulse is imparted by the mechanisms 48, 48A and 48B the valves 256, 258 and 260 will be rendered conductive and the valves 257, 259, and 261 rendered nonconductive in the manner hereinbefore described.

When the valve 256 is conducting, plate current flows from the bus 272 through the left-hand half of the primary coil of the transformer 200 through the valve 256 and the bus 262 to the other terminal of the battery or other plate potential supplying means. This flow of current through the left-hand half of the primary coil of the transformer 200 causes a potential to be induced in the secondary coils of transformer 200 of such polarity that the grids of the A valves of group 6 are rendered positive with respect to their cathodes and the A valve conductive. This same pulse, due to the connections of the right-hand secondary coil, will also tend to render the grids of the B valves of group 6 negative with respect to their cathodes, but this is without effect, since the valves of the groups 6, 8, and 10 are all of the discontinuous control type in that when they once are rendered conductive the grid loses control. As the valve 257 is rendered conductive the valve 256 will become nonconductive, and current will flow from the bus 272 through the right-hand half of the transformer primary coil 200 through the valve 257 to the bus 262. This will cause a voltage of the opposite potential to be induced in the secondary coils so that the grid of the B valves of group 6 will be rendered positive with respect to their associated cathodes and the B valves in condition to conduct. The grids of the A valves of group 6 will be rendered negative with respect to their cathodes, but this is without effect. Assuming the A valves were conducting, as hereinbefore set forth, and the B valves now begin to conduct, the commutating action of the condenser C6 will render the A valves nonconductive as previously described in connection with Fig. 1A. The alternating current generating unit 230, used for frequency control rather than a synchronizer, is driven by the shaft 62C, but in this case, unlike that of the showing in Fig. 2, its output is connected directly into a circuit which is tuned near to the normal output frequency of the unit 230, so that at normal frequency a predetermined current will flow therethrough and through the control winding 280 of the control unit 118A. This current is of sufficient magnitude to control the carbon pile resistor element 128 so that the proper current will flow through the field winding of the motor 78A. Should, for example, the motor 78A increase in speed for some reason, the frequency of the output voltage of the unit 230 would increase. As shown in Fig. 7, the output current through the control unit 280 would decidedly increase to change the adjustment of the carbon pile element 128 so that the flow of current through the field winding of the motor 78A would be increased to cause the motor 78A to slow down somewhat. Likewise, should the speed of the motor 78A be lowered for some reason, the current flowing through the control winding 280 would be reduced, causing the carbon pile element 128 to decrease the flow of current to the field winding of the motor 78A, causing the motor to increase in speed. Due to the fact that the output circuit of the unit 230 is a resonant circuit with the normal frequency supplied thereto substantially midway between the beginning of the resonating range and the peak resonant frequency, as defined hereinbefore, slight changes in output frequency of the unit 230 will cause substantial changes in current flow through the control winding 280 and consequently close control of the speed of the motor 78A.

In Fig. 3 the three-phase current transformer 100 has been omitted and a single-phase current transformer 288 has been utilized instead, it being assumed that there will be no great degree of unbalance in the current flow of the three conductors 42, 66, and 68. The output of the current transformer 288 is rectified and supplied as direct current to the control winding 117 of the control 118A. Increase in current flow through the conductor 42 will increase proportionately the flow of current through winding 117 tending to increase the flow of current through carbon pile 128, decreasing slightly the speed of rotation of the motor 78A to provide a slightly drooping characteristic for the motor 78A with respect to an increased output of the system.

The rotors or rotating members 49, 49A, 49B, and 80 are shown to comprise two poles. If it is desired to decrease the speed of the shafts on which the members are mounted, they may comprise four, six, or eight poles, as may be required. The conducting portions or segments of the commutators 206, 208, and 210 are shown to be two in number, as indicated by the reference characters C and D. If it is desired to reduce the speed of the shaft 62B, these segments may be increased to four, six, or eight, as may be desired.

Although not shown in the drawing, the load to be supplied to any one of my improved devices is connected to conductors 12, 14, and 16. It is obvious that the operating frequency of the device is completely independent of the magnitude of the current drawn by the load. The frequency determining elements, such as the motor 78, receive their excitation from sources independent of the input or output systems.

In accordance with the patent statutes, preferred embodiments of the invention have been described in detail. However, it will be appreciated that in the broad aspect of the invention various modifications in the form, number, and arrangement of the parts, as well as a recombination of the systems and control units therefor shown in the various figures may be made without departing from the spirit and scope of the invention, which is to be limited only by the scope of the appended claims.

What is claimed and is desired to be secured by United States Letters Patent is as follows:

1. In an electrical control system for transferring energy from an electrical input system to an electrical output system, the speed of rotation of said rotary means being independent of the magnitude of said load in said output system, electric valve means interconnecting said systems, rotary means for rendering said valve means conductive in predetermined succession, and means for rotating said rotary means proportional to the desired frequency of said output system.

2. In an electrical control system for transferring energy from an electrical input system to an electrical output system having a load, a plurality of electric valve means, each means comprising an anode and a cathode and a grid, circuit means connecting said anodes to said input system, and said cathodes to said output system, circuits for said grids, rotary means for energizing said grid circuits in predetermined succession whereby each of said grids is periodically rendered at a potential with respect to its associated cathode whereby said valve means are periodically rendered in condition for flow of current therethrough, and means for rotating said rotary means proportional to the desired frequency of said output system, the speed of rotation of said rotary means being independent of the magnitude of said load in said output system.

3. In an electrical control system for transferring energy from an electrical input system to an electrical output system having a load, a plurality of electric valve means, each means comprising an anode and a cathode and a grid, circuit means connecting said anodes to said input system, and said cathodes to said output system, circuits for said grids, rotary means for energizing said grid circuits in predetermined succession whereby each of said grids is periodically rendered at a potential with respect to its associated cathode whereby said valve means are alternately rendered in condition for flow of current therethrough, means for rotating said rotary means proportional to the desired frequency of said output system, and means responsive to variations in speed of said rotary means from the desired speed for regulating the speed of rotation of said rotary means, the speed of rotation of said rotary means being independent of the magnitude of said load in said output system.

4. In an electrical control system for transferring energy from an electrical input system to an electrical output system having a load, a plurality of electric valve means, each means comprising an anode and a cathode and a grid, circuit means connecting said anodes to said input system, and said cathodes to said output system, circuits for said grids, impulse regulating means for said grid circuits, said impulse means being so constructed and arranged relative to said grid circuits as to provide a voltage-time wave shape in said grid circuit of substantially rectangular form, rotary means for controlling said impulse regulating system whereby said grid circuits are energized in predetermined succession for periodically rendering each of said grids at a potential with respect to its associated cathode whereby said valve means are alternately rendered in condition for flow of current therethrough, and means for rotating said rotary means proportional to the desired frequency of said output system, the speed of rotation of said rotary means being independent of the magnitude of said load in said output system.

5. In an electrical control system for transferring energy from an electrical input system to an alternating current electrical output system, a plurality of electric valve means interconnecting said systems, rotary means for controlling the conductivity of said valve means and the frequency of alternations of said output system, a tuned circuit having a resonating frequency range, voltage generating means responsive to the speed of rotation of said rotary means and operable at the predetermined desired rotative speed of said rotary means to generate an alternating voltage within the resonant range of said tuned circuit whereby when the rotative speed of said rotary means varies from said desired speed said generating means will generate an alternating voltage at a different frequency within the resonant frequency range of said tuned circuit, circuit means connecting the output of said generating means to said tuned circuit, and means responsive to current flow in said tuned circuit for altering the speed of rotation of said rotary means.

6. In an electrical control system for transferring energy from an electrical input system to an alternating current electrical output system, a plurality of electric valve means interconnecting said systems, rotary means for controlling the conductivity of said valve means and the frequency of alternations of said output system, a tuned circuit having a resonating frequency range with a peak resonant frequency, voltage generating means responsive to the speed of rotation of said rotary means and operable at the predetermined desired rotative speed of said rotary means to generate an alternating voltage within the resonant range of said tuned circuit but at a frequency other than said peak resonant frequency whereby when the rotative speed of said rotary means varies from said desired speed said generating means will generate an alternating voltage at a different frequency within the resonant frequency range of said tuned circuit, circuit means connecting the output of said generating means to said tuned circuit, and means responsive to the change in current flow in said tuned circuit for altering the speed of rotation of said rotary means in a direction toward said predetermined desired speed.

7. In an electrical control system for transferring energy from an electrical input system to an alternating electrical output system, a plurality of electric valve means interconnecting said systems, rotary means for controlling the conductivity of said valve means, a tuned circuit having a resonating frequency range, voltage generating means responsive to the speed of rotation of said rotary means and operable at the predetermined desired rotative speed of said rotary means to generate an alternating voltage within the resonant range of said tuned circuit whereby when the rotative speed of said rotary means varies from said desired speed said generating means will generate an alternating voltage at a different frequency within the resonant frequency range of said tuned circuit, rectifying means for said tuned circuit, circuit means connecting the output of said generating means to said tuned circuit, and means responsive to rectified current flow in said tuned circuit for altering the speed of rotation of said rotary means.

8. In an electrical control system for transferring energy from an electrical input system to an electrical output system, a plurality of electric valve means, each means comprising an anode and a cathode and a grid, circuit means connecting said anodes to said input system, and said cathodes to said output system, circuits for said grids, rotary means for energizing said grid circuits whereby said grids are alternately biased for alternately rendering said valve means in condition for flow of current therethrough, means for rotating said rotary means proportional to the desired frequency of said output system, a tuned circuit resonant to a predetermined frequency, voltage generating means responsive to the speed of rotation of said rotary means and operable at a predetermined desired rotative speed of said rotary means to generate an alternating voltage having a frequency slightly differing from the resonant frequency of said tuned circuit whereby when the rotative speed of said rotary means changes from said desired speed said generating means will generate an alternating voltage more nearly at the resonant frequency of said tuned circuit, circuit means connecting the output of said generating means to said tuned circuit, and means responsive to current flow in said tuned circuit for altering the speed of rotation of said rotary means.

9. In an electrical control system for transferring energy from an electrical input system to an electrical output system, a plurality of electric valve means, each means comprising an anode and a cathode and a grid, circuit means connecting said anodes to said input system, and said cathodes to said output system, circuits for said grids, rotary means for energizing said grid circuits whereby said grids are alternately biased for alternately rendering said valve means in condition for flow of current therethrough, an electric motor having a speed control mechanism associated therewith for rotating said rotary means proportional to the desired frequency of said output system, a tuned circuit having a resonating frequency range, voltage generating means responsive to the speed of rotation of said rotary means and operable at the predetermined desired rotative speed of said rotary means to generate an alternating voltage within the resonant range of said tuned circuit whereby when the rotative speed of said rotary means changes from said desired speed said generating means will generate an alternating voltage at a different frequency within the resonant frequency range of said tuned circuit, rectifying means for said tuned circuit, circuit means connecting the output of said generating means to said tuned circuit, and means responsive to rectified current flow in said tuned circuit for regulating said speed mechanism whereby the speed of rotation of said rotary means is altered in a direction toward said predetermined speed.

10. In an electrical control system for transferring energy from an electrical input system to an electrical output system, a plurality of electric valve means, each means comprising an anode and a cathode and a grid, circuit means connecting said anodes to said input system, and said cathodes to said output system, circuits for said grids, rotary means for energizing said grid circuits whereby said grids are alternately rendered at a potential with respect to the associated cathode whereby said valve means are alternately rendered in condition for flow of current therethrough, means for rotating said rotary means proportional to the desired frequency of said output system, voltage generating means having an output alternating voltage of a frequency proportional to the speed of rotation of said rotary means, and means responsive to the frequency of said generating means for providing a pulsating control current for said rotating means of constant magnitude and of a frequency proportional to the frequency of said alternating voltage.

11. In an electrical control system for transferring energy from an electrical input system to an electrical output system, a plurality of electric valve means, each means comprising an anode and a cathode and a grid, circuit means connecting said anodes to said input system, and said cathodes to said output system, circuits for said grids, rotary means for energizing said grid circuits whereby said grids are alternately rendered at a potential with respect to the associated cathode whereby said valve means are alternately rendered in condition for flow of current therethrough, means for rotating said rotary means proportional to the desired frequency of said output system, voltage generating means having an output alternating voltage of a frequency proportional to the speed of rotation of said rotary means, a saturating core transformer having an input circuit connected to said generating means and having an output circuit, rectifying means connected to said output circuit and operable to supply a pulsating direct current of constant magnitude and of a frequency proportionate to the frequency of said generating means voltage, and means responsive to said pulsating direct current for regulating the speed of said rotary means.

12. In an electrical control system for transferring electrical energy from a polyphase electrical input system to a polyphase electrical output system having a load, a plurality of pairs of electrical valve means interconnecting said systems, a voltage inducing mechanism for alternately rendering conductive each of the valve means of the pairs of valve means, a common means for rotating said mechanisms, means controlling the speed of rotation of said common rotating means whereby each of said valve means is rendered in condition to conduct once each cycle of the output system, the speed of rotation of said common rotating means being independent of the magnitude of said load in the output system.

13. In a system for supplying a multiphase alternating current output circuit from a source of electrical energy, the combination of a plurality of translating units individual to said phases and common to said source, each unit including means actuable to translate energy from the source to single-phase alternating current and delivering the same to a corresponding phase of said output circuit, means for supplying a periodic voltage to said units comprising a rotatable means having an output circuit for each of said phases, means connecting said rotating means output circuits to said units whereby each unit is operable to receive a periodic voltage impulse each cycle of said output circuit, and means for rotating said rotatable means at a predetermined speed.

14. A system for supplying a multiphase alternating current output circuit by a pair of interconnecting networks from a source of electrical energy, in which each network comprises a plurality of translating units individual to said phases and common to said source, each unit including means actuable to translate energy from the source to single-phase alternating current and delivering the same to a corresponding phase of said output circuit, means for supplying a periodic voltage to said units comprising a rotatable means having an output circuit for each of said phases, means connecting said rotating means output circuits to said units whereby each unit is operable to receive a periodic voltage impulse each cycle of said output circuit, means for rotating said rotatable means at a predetermined speed, and a polyphase generating means rotatable by said rotating means; and circuit means interconnecting said generating means whereby said networks are maintained in synchronism.

15. A system for supplying a multiphase alternating current output circuit by a pair of interconnecting networks from a source of electrical energy, in which each network comprises a plurality of translating units individual to said phases and common to said source, each unit including means actuable to translate energy from the source to single-phase alternating current and delivering the same to a corresponding phase of said output circuit, means for supplying a periodic voltage to said units comprising a rotatable means having an output circuit for each of said phases, means connecting said rotating means output circuits to said units whereby each unit is operable to receive a periodic voltage impulse each cycle of said output circuit, means for regulating the speed of rotation of said rotatable means and circuit means for producing a potential proportional to the output of said units; and circuit means interconnecting said speed regulating means and said potential producing circuit means whereby the phase angles of each nework will be relatively adjusted to proportion the load between said networks.

16. A system for supplying a multiphase alternating current output circuit by a pair of interconnecting networks from a source of electrical energy, in which each network comprises a plurality of translating units individual to said phases and common to said source, each unit including means actuable to translate energy from the source to single-phase alternating current and delivering the same to a corresponding phase of said output circuit, means for supplying a periodic voltage to said units comprising a rotatable means having an output circuit for each of said phases, means connecting said rotating means output circuits to said units whereby each unit is operable to receive a periodic voltage impulse each cycle of said output circuit, means for regulating the speed of rotation of said rotatable means, a circuit including rectifying means and a resistor connected for flow of rectified current, and means for causing a flow of current in said last-named circuit proportional to the current flow through said units; and circuit means interconnecting said regulating means and said resistors whereby the phase angles of each network will be relatively adjusted to proportion the current flow from said source to said output circuit between said networks.

17. In an electrical control system for transferring electrical energy from a polyphase electrical input system to a polyphase electrical output system, a plurality of pairs of electrical valve means, each of said pairs being connected to a different phase of said output system, each of said valve means having anode means connected to certain phases of said input system and a common grid connection and common cathode connection, circuit means connecting the common cathode connections of said pairs of valve means to a phase of said output system, a voltage inducing mechanism for each of the pairs of common grid connections for each of said pairs of valve means, a common means for rotating said mechanisms, means controlling the speed of rotation of said common rotating means whereby each of said common grid connections is rendered at a potential relative to that of the associated common cathode connection for placing each valve means in condition to conduct once each cycle of the output system.

18. In an electrical control system for transferring electrical energy from a polyphase electrical input system to a polyphase electrical output system, a plurality of pairs of electrical valve means, each of said pairs being connected to a different phase of said output system, each of said valve means having anode means connected to certain phases of said input system and a common grid connection and common cathode connection, circuit means connecting the common cathode connections of said pairs of valve means to a phase of said output system, a voltage inducing mechanism for each of the pairs of common grid connections for each of said pairs of valve means, said inducing mechanism being operable to generate a substantially rectangular voltage wave shape, a common means for rotating said mechanisms, means controlling the speed of rotation of said common rotating means whereby each of said common grid connections is rendered at a potential relative to that of the associated common cathode connection for placing each valve means in condition to conduct once each cycle of the output system.

19. In an electrical control system for transferring energy from an electrical input system to an electrical output system having a load, electric valve means interconnecting said systems, rotary means for rendering said valve means conductive in predetermined succession independently of said input system, and means for rotating said rotary means proportional to the desired frequency of said output system, the speed of rotation of said rotary means being independent of the magnitude of said load in the output system.

PAUL T. NIMS.

REFERENCES CITED

The following references are of record in the file of this patent:

UNITED STATES PATENTS

| Number | Name | Date |
| --- | --- | --- |
| 1,954,661 | Alexanderson et al. | Apr. 10, 1934 |
| 1,971,188 | Kramer | Aug. 21, 1934 |

Certificate of Correction

Patent No. 2,447,134. August 17, 1948.

PAUL T. NIMS

It is hereby certified that errors appear in the printed specification of the above numbered patent requiring correction as follows: Column 7, line 55, for "charges" read *changes*; column 19, line 16, for "nework" read *network*; and that the said Letters Patent should be read with these corrections therein that the same may conform to the record of the case in the Patent Office.

Signed and sealed this 2nd day of November, A. D. 1948.

[SEAL]

THOMAS F. MURPHY,
*Assistant Commissioner of Patents.*